3,075,495
AUTOMATIC MULTI-TIER POULTRY FEEDER
Donald A. Stoterau and Donald E. Cochran, Luverne, Minn., assignors to A. R. Wood Manufacturing Company, Luverne, Minn., a corporation of Minnesota
Filed Feb. 11, 1960, Ser. No. 8,006
4 Claims. (Cl. 119—21)

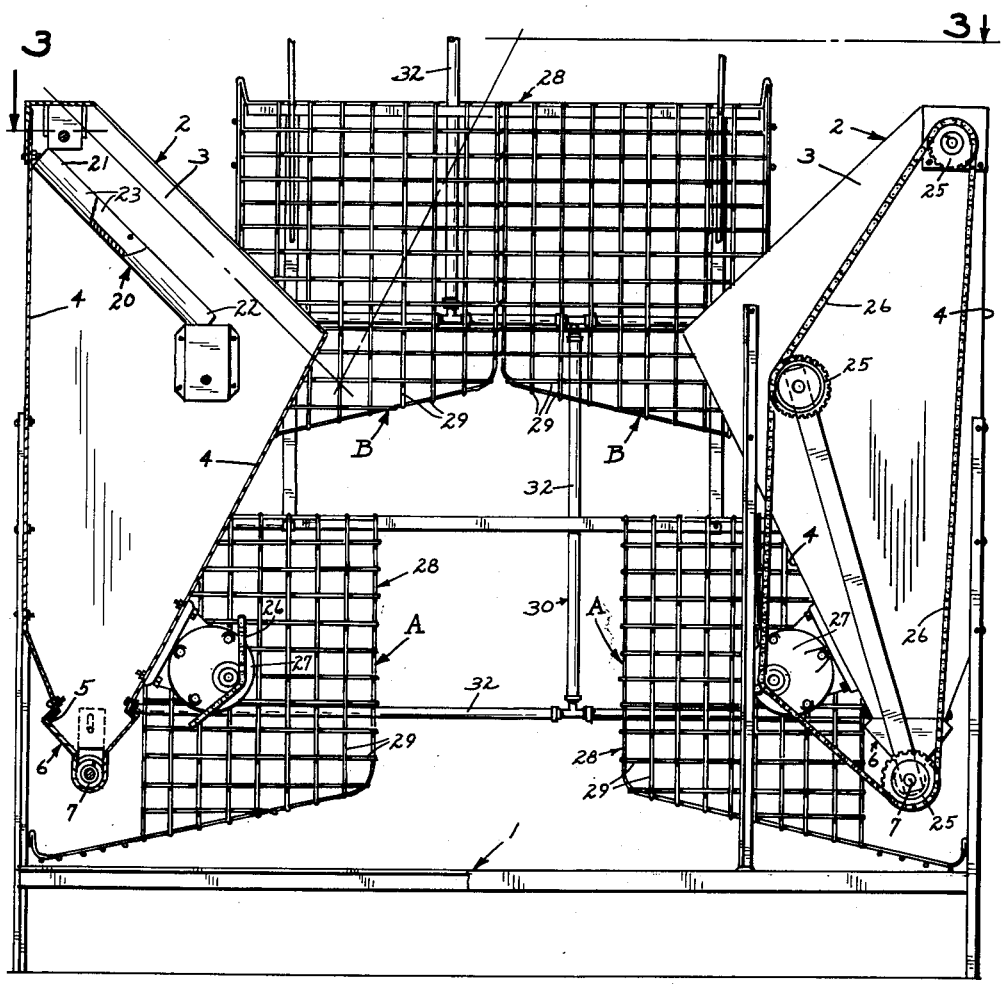
FIG. 2
FIG. 6
INVENTOR.
DONALD A. STOTERAU
DONALD E. COCHRAN
BY
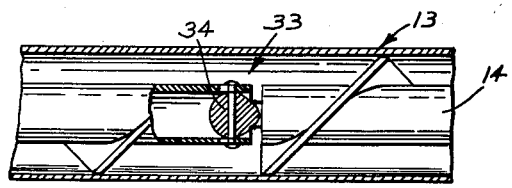
ATTORNEYS Jan. 29, 1963 D. A. STOTERAU ET AL 3,075,495
AUTOMATIC MULTI-TIER POULTRY FEEDER
Filed Feb. 11, 1960 3 Sheets-Sheet 3
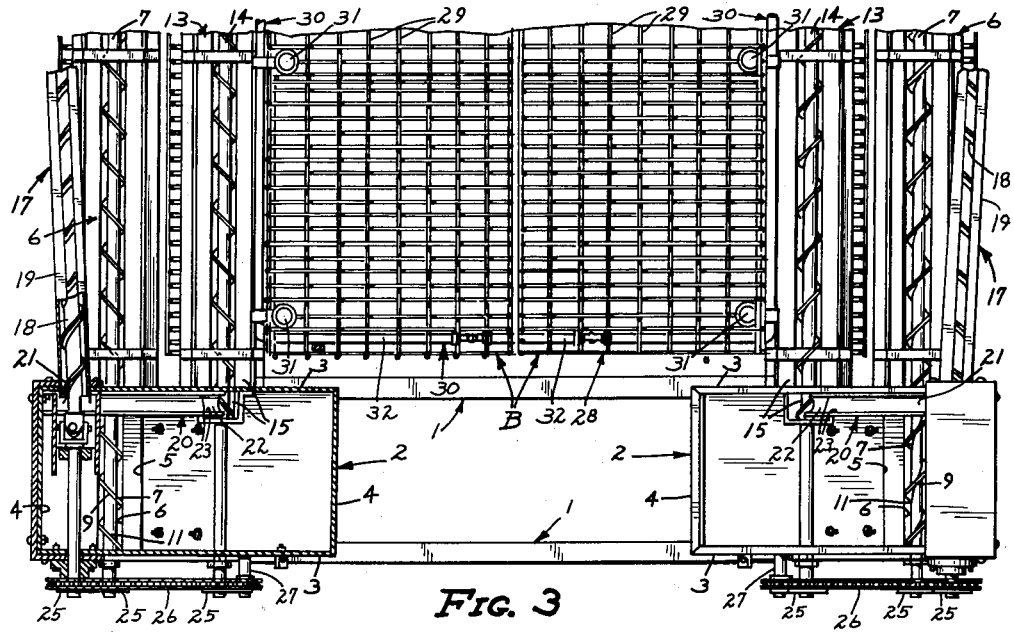
FIG. 3
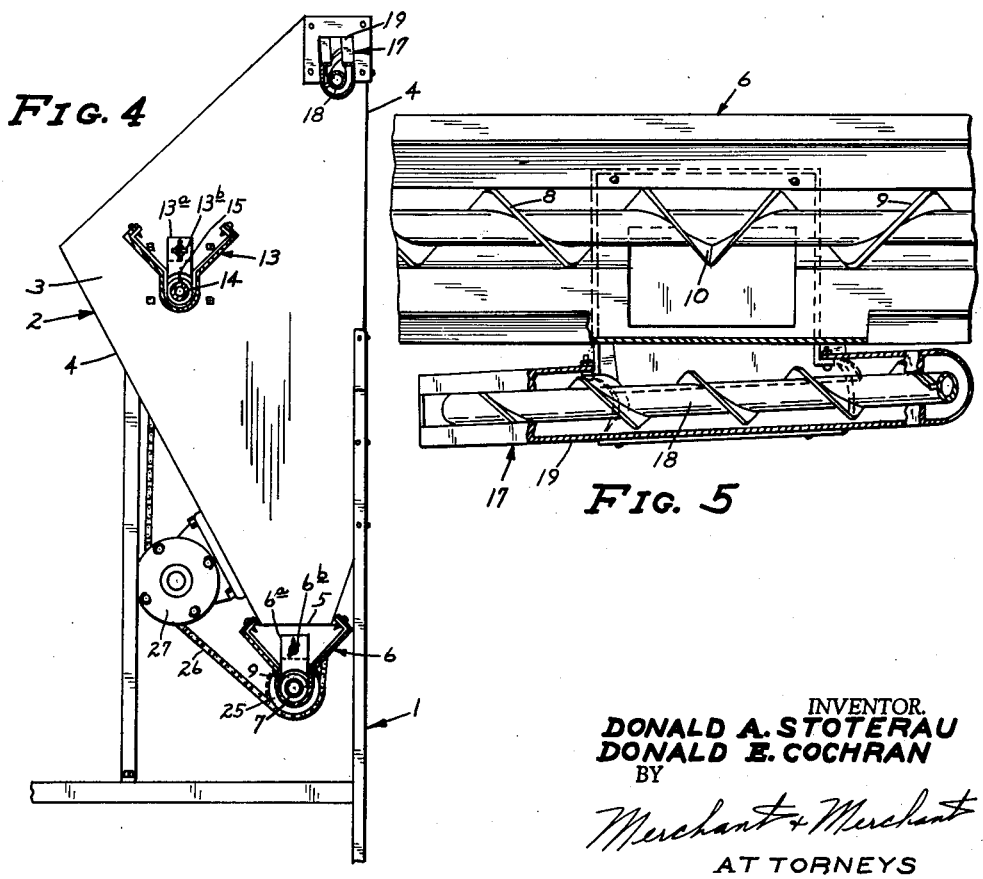
FIG. 4
FIG. 5
INVENTOR.
DONALD A. STOTERAU
DONALD E. COCHRAN
BY
*Merchant & Merchant*
ATTORNEYS United States Patent Office  3,075,495
Patented Jan. 29, 1963

This invention relates generally to automatic poultry feeders and more particularly to a novel automatic multi-tier poultry feeder which answers a long standing need in the poultry industry for an efficient and economic device of this type.

An object of our invention is the provision of a completely automatic feeder for chickens, turkeys, and the like in which a feed containing hopper continuously supplies ground or granular feed to a plurality of tiers of feeding troughs by a continuous conveying system associated with said troughs and said hopper.

A further object of our invention is the provision of an automatic multi-tier poultry feeder which will supply ground or granular feed to a flock of poultry at a rate of speed heretofore thought impossible, and which will do so at a cost of approximately one-half that of slower and otherwise inferior feeders.

A further object of our invention is the provision of an automatic multi-tier poultry feeder which may be utilized in application with any number of tiers of poultry cages spaced above each other, and which therefore discloses an automatic poultry feeder of almost unlimited capacity.

Another object of our invention is the provision of an automatic multi-tier poultry feeder which without the poultry enclosing cages may also be utilized as a floor feeder in a poultry house. In such an application, the feeder would have only a pair of feeding tiers, the lowest of which would be spaced sufficiently close to the floor to feed broilers while they were small and the highest of said tiers being spaced sufficiently high above the floor that only the larger birds could reach it. However, when the birds reach maturity, all of the tiers would be available to provide fast and efficient feeding of the entire flock.

A further object of our invention is the provision of an automatic multi-tier poultry feeder in which the feed in the feeding troughs is maintained at a generally constant level throughout the conveying circuit.

A further object of our invention is the provision of an automatic multi-tier poultry feeder that is constructed in the longer units with spaced flexible conveyor joints which enable the conveyor to be self-leveling with respect to the conveyor trough.

A further object of our invention is the provision of an automatic multi-tier poultry feeder which is both relatively inexpensive to manufacture and operate and which is still durable and easily cleanable throughout long and heavy use.

The above and still further objects of our invention will become apparent from the following detailed specification, appended claims and attached drawings.

Referring to the drawings wherein like characters indicate like parts throughout the several views:

FIG. 2 is a view in end elevation showing a cooperating pair of our poultry feeders, some parts being broken away and some parts shown in section;

FIG. 3 is a horizontal sectional view taken on the irregular line 3—3 of FIG. 2, some parts being broken away;

FIG. 4 is a vertical sectional view taken on the line 4—4 of FIG. 1, some parts being broken away;

FIG. 5 is an enlarged detailed sectional view taken on the line 5—5 of FIG. 1, some parts being broken away, and FIGURE 6 is an enlarged detail taken on the line 6—6 of FIG. 1.

Figure 1:
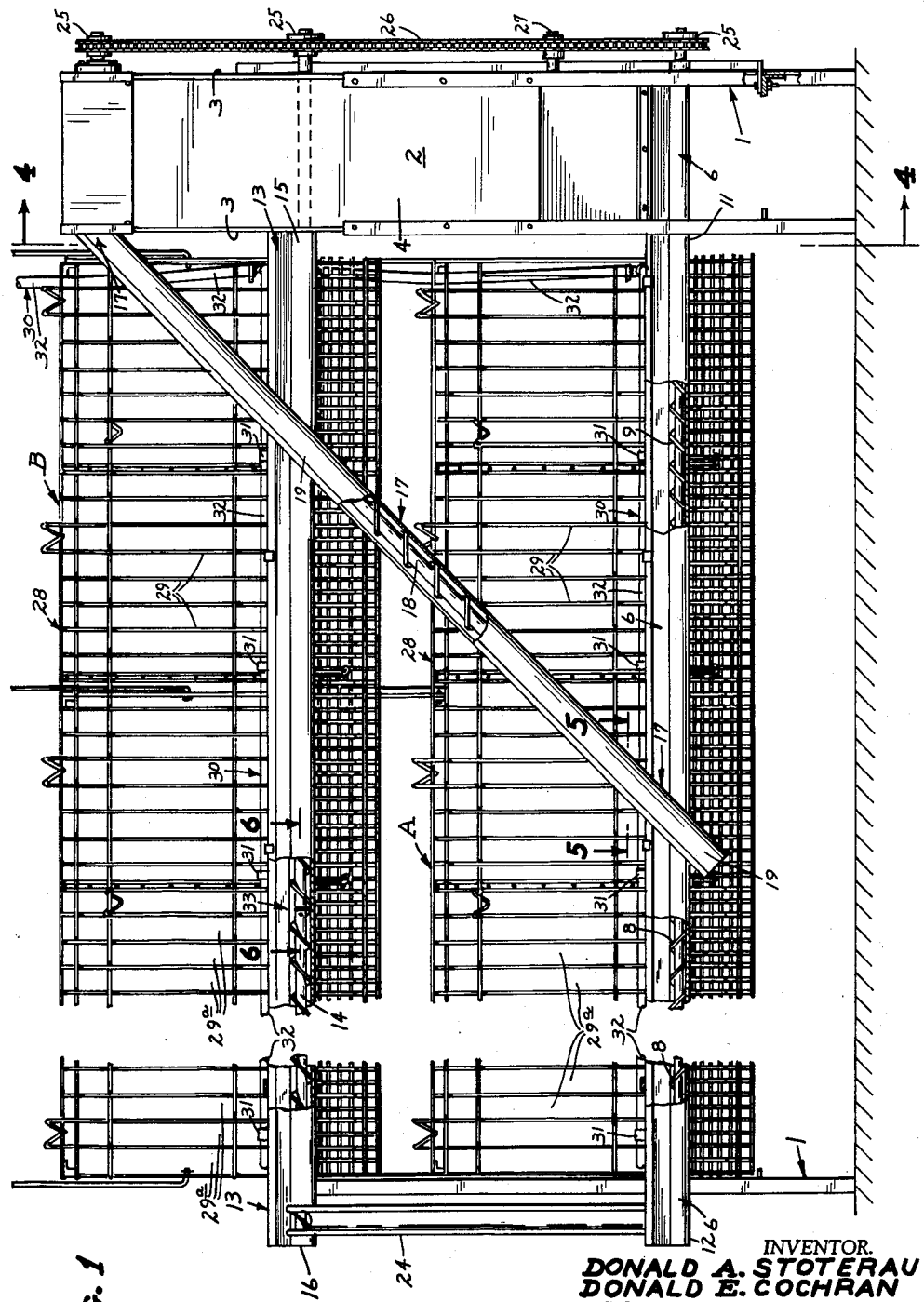
FIG. 1 is a view in front elevation of our automatic multi-tier poultry feeder, some parts being broken away and some parts shown in section.

Referring with greater particularity to the drawings, the reference numeral 1 represents generally the frame upon which many of the remaining elements are secured. The reference numeral 2 represents generally a feed containing hopper fabricated preferably and as shown from thin sheet material. The open top hopper 2 has spaced end portions 3 and side portions 4 which converge downwardly to define an elongated opening 5 in the bottom of said hopper 2.

Although our invention may be utilized in combination with any reasonable number of vertically spaced tiers, it is sufficient for purposes of disclosure to specify the same in terms of a pair of vertically spaced tiers, the lower of which is indicated by the letter A, and the upper by the letter B. Secured to the hopper 2 directly below the opening 5 in said hopper 2 and extending horizontally therefrom is a lower feeding trough 6. A lower conveyor 7, preferably and as shown being of the helical auger type, is disposed within said lower trough 6 and directly below the opening 5 in said hopper 2. The lower conveyor 7 has oppositely spiraling helices 8, 9 which meet intermediate the ends of said lower conveyor 7 to form a V-shaped throw-off 10, see FIG. 5. The end 11 of said lower conveyor 7 is disposed in relationship to the opening 5 in said hopper 2 so as to remove feed from the hopper 2 when the lower conveyor 7 is rotated. Since the lower conveyor 7 has oppositely spiraling helices 8, 9, the end 12 opposite the end 11 which communicates with said hopper 2 is also a receiving end.

Forming a part of the upper tier B, is an upper feeding trough 13 which is spaced vertically above said lower trough 6 and secured to said frame 1 and hopper 2. An upper conveyor 14, also of the helical auger type, is disposed within said upper trough 13. The upper conveyor 14 continuously spirals in one direction so as to maintain a receiving end 15 and an outlet end 16. An elevating conveyor represented generally by the numeral 17, and having a helical auger 18 disposed within a housing 19, is associated with said lower conveyor 7 and said upper conveyor 14. The elevating conveyor 17 is disposed and rotated so as to raise feed expelled by said throw-off 10 of said lower conveyor 7 to the inlet end 21 of an overflow chute represented generally by the numeral 20 and disposed within said hopper 2 adjacent said upper trough 13. The overflow chute 20 is disposed with its inlet end 21 substantially higher than its outlet end 22 which connects to the inlet end of said upper conveyor 14. Said overflow chute 20 is generally cross-sectionally U-shaped and has side walls 23 which are only high enough to give the overflow chute 20 a carrying capacity substantially equal to that of the upper trough 13. Such an arrangement insures that the complete conveying system will have a constant level of feed since any excess feed over the amount needed to fill the upper trough 13 which is brought from the lower trough 6 to the overflow chute 20 is returned to the hopper 2 by flowing over the sides 23 of the overflow chute 20. For the purpose of adjustably restricting the amount of feed which enters both the upper and lower troughs 6, 13, restrictor plates, 6a and 13a respectively, are adjustably secured to the end portions 3 of the hopper 2 by suitable fasteners 6b and 13b respectively.

In order that feed may travel from the outlet end 16 of the upper conveyor 14 to the receiving end 12 of the lower conveyor 7, a dropping chute 24 is provided and connects the two tiers A, B together. Corresponding ends of each of the conveyors 7, 14, 17 are fitted with annular sprockets 25 which are entrained by a drive chain 26, as shown at the left side of FIG. 3. A motor and gear reduction unit 27 is associated with said drive chain 26 and imparts concerted rotation to said conveyors 7, 14, 17.

Of course, it will be understood that if it is desired to add more tiers to the above described structure, this is easily accomplished merely by adding conveyor components corresponding to those described above. If it is desired to use any feeder to automatically feed caged poultry, the above described device is fitted, preferably and as shown, with poultry cages, represented generally by the numeral 28, secured to said frame 1 and disposed adjacent to the upper and lower troughs 6, 13. The cages 28 are preferably and as shown fabricated from wire screen material 29 and define spaced openings 29a adjacent said troughs 6, 13. The openings 29a are of sufficient size to enable the enclosed poultry to easily reach through them and thereby feed from said troughs 6, 13. Associated with the cages 28 is a watering system represented generally by the numeral 30. The watering system includes a plurality of watering cups 31 spaced conveniently inside said cages 28 and connected to a water supply hose 32.

Although each device as above described is complete in itself, the automatic feeder may be economically manufactured as shown in pairs of tiers both secured to the same frame 1. When the above described invention is manufactured in units longer than approximately ten feet, it becomes necessary for efficient operation and maintenance of a constant flow of feed that suitable means represented generally by the numeral 33 be employed for leveling the lower and upper conveyors 7, 14 with respect to the troughs 6, 13. The means 33 for leveling is preferably, and as shown more particularly in FIG. 6, comprised of a universal joint 34.

When the above described structure has been assembled for operation, the ground or granular feed is placed into the hopper 2 and the motor 27 started, which in turn causes rotation of the conveyors 7, 14, 17. From this time on the device is completely automatic, and only needs the addition of more feed when the supply in the hopper 2 is depleted.

This invention has been thoroughly tested and found to be completely satisfactory for the accomplishment of the above objects; and while we have shown a preferred embodiment thereof, we wish it to be specifically understood that same may be modified without departure from the scope and spirit of the appended claims.

What we claim is:

1. An automatic multi-tier poultry feeder comprising a frame, a feed containing hopper secured to said frame, said hopper having an opening in the bottom thereof, a lower feeding trough secured to said frame and disposed below and extending horizontally from the opening in said hopper, a lower auger conveyor disposed within said lower trough and below the opening in said hopper, said lower auger having oppositely spiraling helices which meet intermediate the ends of the lower auger to form a V-shaped throw-off, means mounting said lower auger for rotation so as to define receiving ends at both ends of said lower trough, the lower auger being disposed so that feed is removed from the hopper at the one of said receiving ends of said lower trough, disposed adjacent said hopper, an upper feeding trough spaced vertically above said lower trough and secured to said frame, an upper auger conveyor disposed within said upper trough, means mounting said upper auger conveyor for rotation so as to maintain receiving and outlet ends of said upper trough, said auger-equipped upper trough being disposed with its receiving end in communication with said hopper, an elevating conveyor for raising feed expelled by said throw-off of said lower auger and adapted to direct the same to the receiving end of said upper trough, a dropping chute connecting the outlet end of said upper trough to the other receiving end of said lower trough for returning excess feed from the outlet end of the upper trough to the lower trough, and means associated with said auger conveyors for imparting said rotation thereto.

2. An automatic multi-tier poultry feeder comprising a frame, a feed containing hopper secured to said frame, said hopper having an opening in the bottom thereof, a lower feeding trough secured to said frame and disposed below and extending horizontally from the opening in said hopper, a lower auger conveyor disposed within said lower trough and below the opening in said hopper, said lower auger having oppositely spiraling helices which meet intermediate the ends of the lower auger to form a V-shaped throw-off, means mounting said lower auger for rotation so as to define receiving ends at both ends of said lower trough, the lower auger being disposed so that feed is removed from the hopper at the one of said receiving ends of said lower trough, disposed adjacent said hopper, an upper feeding trough spaced vertically above said lower trough and secured to said frame, an upper auger conveyor disposed within said upper trough, means mounting said upper auger conveyor for rotation so as to maintain receiving and outlet ends of said upper trough, said auger-equipped upper trough being disposed with its receiving end in communication with said hopper, an elevating conveyor for raising feed expelled by said throw-off of said lower auger and adapted to direct the same to the receiving end of said upper trough, an overflow outlet associated with said elevating conveyor and disposed within said hopper for discharging into said hopper the feed elevated by said elevating conveyor which is in excess of the acceptable feed capacity of the receiving end of said upper trough, a dropping chute connecting the outlet end of said upper trough to the other receiving end of said lower trough for returning excess feed from the outlet end of the upper trough to the lower trough, and means associated with said auger conveyors for imparting said rotation thereto.

3. An automatic multi-tier poultry feeder comprising a frame, a feed containing hopper secured to said frame, said hopper having an opening in the bottom thereof, a lower feeding trough secured to said frame and disposed below and extending horizontally from the opening in said hopper, a lower auger conveyor disposed within said lower trough and below the opening in said hopper, said lower auger having oppositely spiralling helices which meet intermediate the ends of the lower auger to form a V-shaped throw-off, means mounting said lower auger for rotation so as to define receiving ends at both ends of said lower trough, the lower auger being disposed so that feed is removed from the hopper at the one of said receiving ends of said lower trough, disposed adjacent said hopper, an upper feeding trough spaced vertically above said lower trough and secured to said frame, an upper auger conveyor disposed within said upper trough, means mounting said upper auger conveyor for rotation so as to maintain receiving and outlet ends of said upper trough, said auger-equipped upper trough being disposed with its receiving end in communication with said hopper, an elevating conveyor for raising feed expelled by said throw-off of said lower auger and adapted to direct the same to the receiving end of said upper trough, said elevating conveyor comprising an elongated tubular housing, an elongated auger concentrically disposed within said housing, and means mounting and powering said auger for feed-elevating rotation thereof, the upper end of said elevating conveyor being disposed at a higher elevation than said receiving end of said upper trough, said poultry feeder further comprising an overflow outlet, said overflow outlet comprising an inclined generally channel-shaped chute secured within said hopper, said overflow chute having its upper end in feed-transferring communication with the upper end of said elevating conveyor and having its lower end in feed-transferring communication with said receiving end of said upper trough, said overflow chute having a cross-section sufficient to convey to said receiving end of said upper trough only an amount of feed equal to the acceptable feed capacity thereof and to discharge the excess feed into said hopper, a dropping chute connecting the outlet end of said upper trough to the other receiving end of said lower trough for returning excess feed from the outlet end of the upper trough to the lower trough, and means associated with said auger conveyors for imparting said rotation thereto.

4. In a poultry feeder, a feed-containing hopper, an elongated generally V-shaped feeding trough coupled with said hopper and extending generally horizontally therefrom, said feeding trough comprising a cross-sectionally generally U-shaped portion having spaced generally upstanding side walls and a generally arcuate bottom wall, said trough further comprising a pair of spaced and diverging side portions each one of which is joined with and extends upwardly and outwardly from a different one of the side walls of said U-shaped portion, said poultry feeder further comprising an elongated helical auger which communicates with said hopper and which is generally coaxially disposed within said U-shaped portion of said trough generally below the junctions of said diverging side portions with said side walls of the U-shaped portion of said trough, and means for imparting rotation to said auger for moving feed from said hopper longitudinally of said trough.

References Cited in the file of this patent
UNITED STATES PATENTS

| | | |
|---|---|---|
| 2,585,698 | Spring | Feb. 2, 1952 |
| 2,681,538 | Flansaas | June 22, 1954 |
| 2,738,765 | Hart | Mar. 20, 1956 |
| 2,738,766 | Hart | Mar. 20, 1956 |
| 2,754,801 | Reese | July 17, 1956 |
| 2,794,421 | Rose et al. | June 4, 1957 |
| 2,801,610 | Wallace et al. | Aug. 6, 1957 |
| 2,942,574 | Golay | June 28, 1960 |
| 2,987,038 | Cole | June 6, 1961 |